US008817396B2

(12) United States Patent
Mori et al.

(10) Patent No.: US 8,817,396 B2
(45) Date of Patent: Aug. 26, 2014

(54) IMAGING LENS UNIT AND PRODUCTION METHOD OF THE SAME (75) Inventors: Hajime Mori, Fuchu (JP); Takemi Miyazaki, Hamura (JP); Akihiko Matsumoto, Hino (JP); Takashi Fujii, Hachioji (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/522,890

(22) PCT Filed: Dec. 22, 2010

(86) PCT No.: PCT/JP2010/073141
§ 371 (c)(1),
(2), (4) Date: Jul. 18, 2012

(87) PCT Pub. No.: WO2011/089815
PCT Pub. Date: Jul. 28, 2011

(65) Prior Publication Data
US 2012/0293878 A1    Nov. 22, 2012

(30) Foreign Application Priority Data
Jan. 21, 2010   (JP) ................. 2010-010979

(51) Int. Cl.
*G02B 7/02*        (2006.01)
(52) U.S. Cl.
CPC .............. *G02B 7/026* (2013.01); *G02B 7/021* (2013.01); *G02B 7/022* (2013.01)
USPC .......................................... 359/808; 359/818
(58) Field of Classification Search
CPC .......... G02B 7/02; G02B 7/021; G02B 7/022; G02B 7/026; G02B 7/027
USPC ................. 359/808, 811, 818, 819, 827, 828
See application file for complete search history.

(56) References Cited

U.S. PATENT DOCUMENTS

| | | | | |
|---|---|---|---|---|
| 5,684,644 | A * | 11/1997 | Spears et al. | 359/823 |
| 2008/0273255 | A1 * | 11/2008 | Yang et al. | 359/819 |
| 2009/0086342 | A1 | 4/2009 | Seki | |

FOREIGN PATENT DOCUMENTS

| | | |
|---|---|---|
| JP | 1-263034 | 10/1989 |
| JP | 5-42559 | 2/1993 |
| JP | 10-253864 | 9/1998 |
| JP | 2000-162485 | 6/2000 |
| JP | 2000-167885 | 6/2000 |
| JP | 2001-051177 | 2/2001 |
| JP | 2002-18898 | 1/2002 |
| JP | 2007-313767 | 12/2007 |
| JP | 2008-039895 | 2/2008 |

(Continued)

*Primary Examiner* — Darryl J Collins
(74) *Attorney, Agent, or Firm* — Cozen O'Connor (57) ABSTRACT Disclosed is an imaging lens unit that prevents the detachment of a cover from a holder. The imaging lens unit (200) is provided with a combination lens (6) and an external covering that is formed from at least the holder (2) and the cover (4) and covers the combination lens (6) from the outside, wherein the holder (2) and the cover (4) are connected by means of fitting members (70) that are integrally formed from a resin material and have, on both ends, a first fitting (78) that fits with a section of the holder (2) and a second fitting (80) that fits with a section of the cover (4).

20 Claims, 9 Drawing Sheets

(56) References Cited

FOREIGN PATENT DOCUMENTS

| | | |
|---|---|---|
| JP | 2008-170534 | 7/2008 |
| JP | 2008-221565 | 9/2008 |
| JP | 2009-53530 | 3/2009 |
| JP | 2009-157279 | 7/2009 |
| JP | 2009-242456 | 10/2009 |
| WO | WO 02/38357 | 5/2002 |
| WO | WO 2009/005317 | 1/2009 |

* cited by examiner

IMAGING LENS UNIT AND PRODUCTION METHOD OF THE SAME

RELATED APPLICATIONS

This is a U.S. National Phase Application under 35 USC 371 of International Application PCT/JP2010/073141 filed on Dec. 22, 2010.

This application claims the priority of Japanese Application No. 2010-010979 filed Jan. 21, 2010, the entire content of which is hereby incorporated by reference.

TECHNICAL FIELD

The present invention relates to an imaging lens unit and a production method of the same.

BACKGROUND ART

In recent years, there has been a well-known technology, in which, resin optical systems (which are lenses or lens groups), holders (which are body sections), and covers (which are cover sections) of said optical systems are molded by common molding dies. After that these molded members are assembled (Patent Document 1).

According to a technology detailed in Patent Document 1, an optical system (being lenses 35 and 37), a holder (being cylindrical frame 33), and a cover (being cover section 38) are simultaneously molded. While the optical system and the cover are made to remain in stationary molding die (3), movable molding die (4) is moved so that the optical system is inserted into the molded holder, whereby the cover is adhered to them (paragraphs 0026 to 0032).

PRIOR ART DOCUMENT

Patent Document

Patent Document 1: Unexamined Japanese Patent Application Publication No. 2008-221565

SUMMARY OF THE INVENTION

Problems to be Solved by the Invention

According to the above technology in which the optical system is accommodated in the holder, to be covered with the cover, it is necessary that the center of the holder and the center of an opening section (being a diaphragm) of the cover are aligned to match the optical axis of the optical system. The assembling work of the optical system to include the holder and the cover requires high accuracy for positioning them.

However according to the technology detailed in Patent Document 1, ball screw (8) is driven to be rotated so that the movable molding die (being a holder after the molding work) is shifted. At a position to face the cover, the holder and the cover are cramped and adhered to each other. Since the holder is cylindrical, the adhering area is small, so that the cover may become separated from the holder.

To overcome this problem, an object of the present invention is to offer an imaging lens unit and its producing method, in which a cover is prevented from separating from a holder, without depending on the adhering area between the holder of the optical system and the cover.

Means for Solving the Problem

According to an embodiment of the present invention, for solving the above problem, an imaging lens unit is offered, wherein said imaging lens unit is characterized in that:

an optical lens; and an external covering which is structured of at least a holder and a cover for coveting the optical lens from an outer section, wherein the holder the cover are fitted via a fitting member which is integrally molded by a resin material having a first fitting section for fitting onto a part of the holder and a second fitting member for fitting onto a part of the cover, at both ends of the fitting member.

According to another embodiment of the present invention, a production method for producing an imaging lens unit is offered, wherein said imaging lens unit includes:

an optical lens; and an external covering which is structured of at least a holder and a cover for covering the optical lens from an outer section, wherein the holder and the cover are fitted via a fitting member which is integrally molded by a resin material having a first fitting section for fitting onto a part of the holder and a second fitting member for fitting onto a part of the cover, at both ends of the fitting member, wherein the production method for producing the imaging lens unit is characterized to include steps of:

forming a holder molding empty space for molding the holder and a cover molding empty space for molding the cover, between a first molding die and a second molding die to be cramped to each other;

molding the holder and the cover at the same time, while injecting melted resin into the holder molding empty space and the cover molding empty space;

opening the first molding die and the second molding die, while in one of which the holder is kept, and in another one of which the cover is kept;

shifting at least one of the first molding die and the second molding die in a direction perpendicular to a die opening closing direction against the other molding die, and shifting the holder and the cover to a position where the holder and the cover are joined, after the step of opening the dies is conducted;

inserting the optical lens into the holder through the opening, after the step of opening the dies is conducted;

closing the first molding die and the second molding die, after the step of shifting the die is conducted, and determining a position of the holder carrying the lens and a position of the cover;

forming a molding empty space for a second molding operation, between a third molding die and the holder and the cover, both of whose positions have been determined; and joining the holder and the cover via a fitting member which is formed by injecting the melted resin into a molding empty space for the second molding operation.

Effect of the Invention

According to the present invention, a fitting member is provided (molded), and the holder and the cover are fitted by means of said fitting member, so that the holder and the cover can be securely connected to each other regardless of the adhering area of the holder and the cover, whereby the cover is prevented from separating from the holder.

EMBODIMENTS FOR CONDUCTING THE INVENTION

Preferable Embodiments will now be detailed while referring to the drawings.

Figure 1:
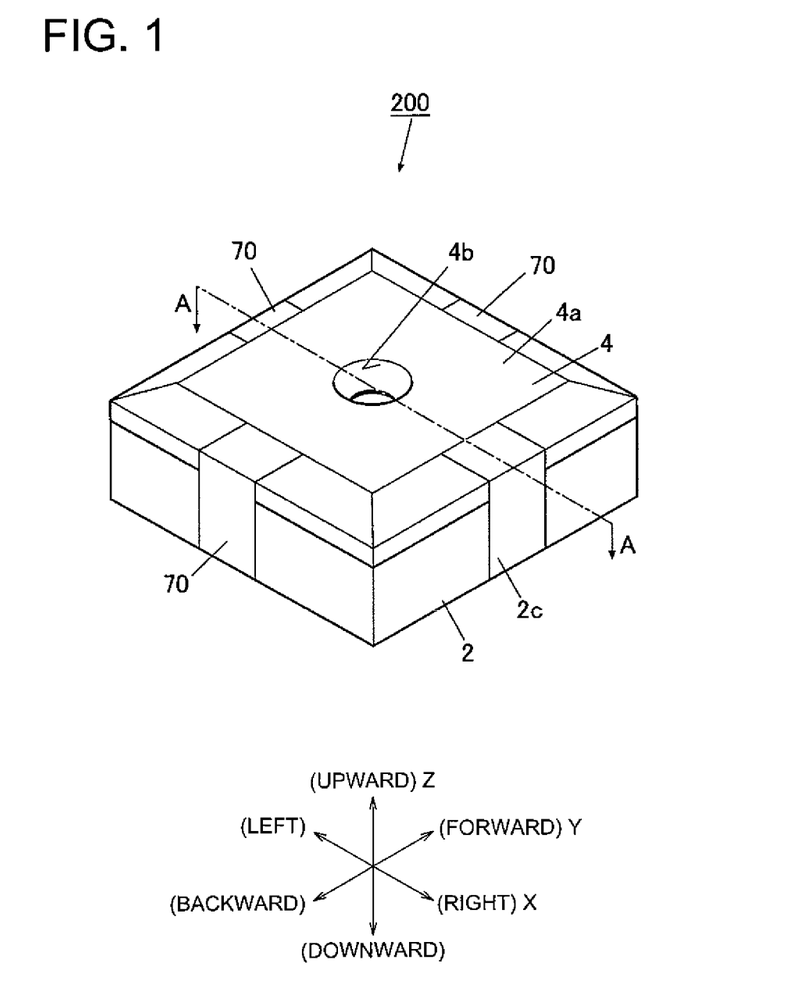
FIG. 1 is a perspective view to show a schematic structure of an imaging lens unit.

As shown in FIG. 1, imaging lens unit 200 includes holder 2 and cover 4, wherein combination lens (6) is covered with holder 2 and cover 4, that is, holder 2 and cover 4 are an external covering for covering combination lens (6).

Holder 2 is a box whose top is opened. Holder 2 is formed of resin, and preferably formed of a material which is durable in a reflow soldering process.

Figure 2:
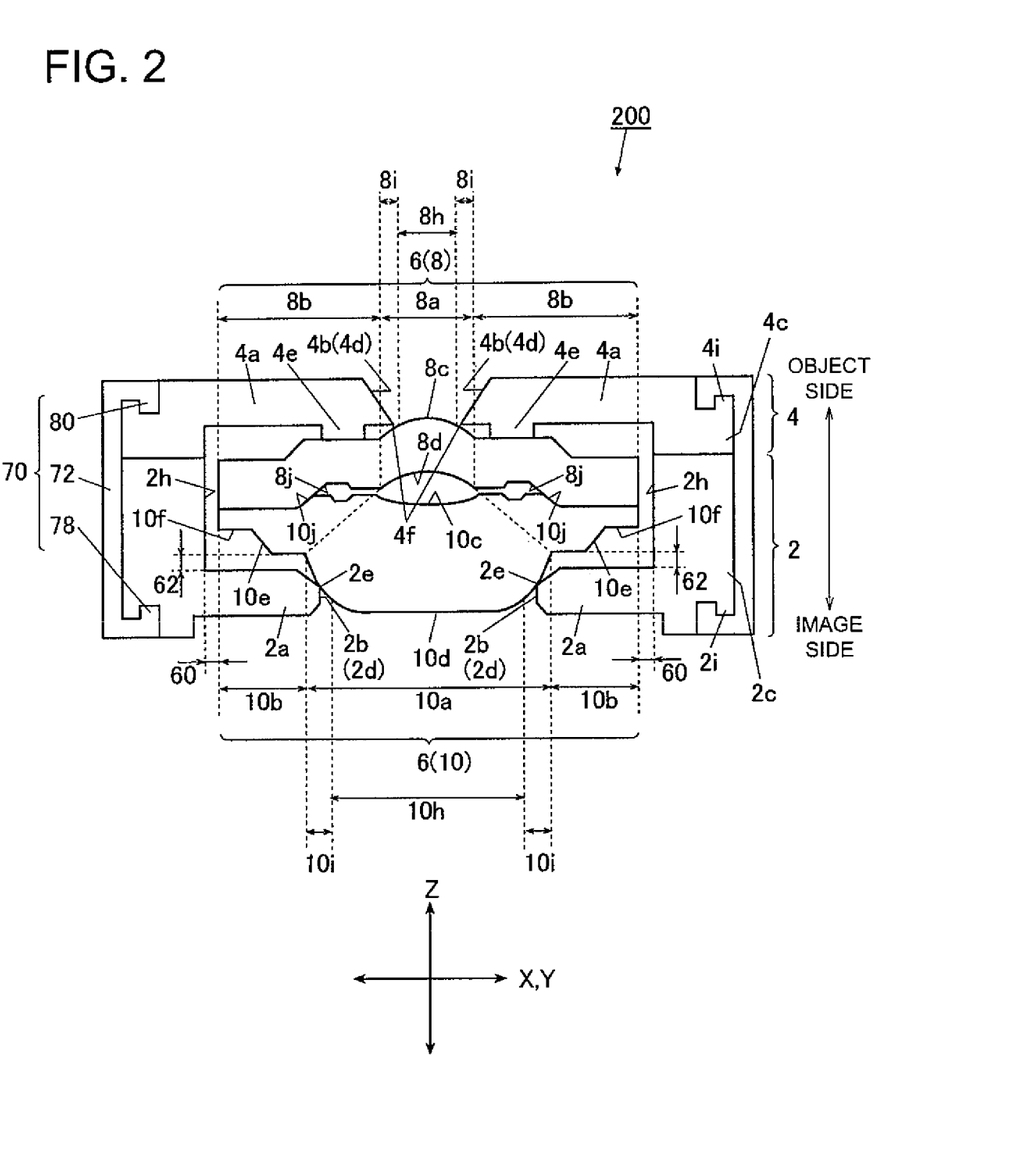
FIG. 2 is a cross-sectional view along line A-A in FIG. 1.

As shown in FIG. 2, opening section 2h is formed on holder 2, through which combination lens 6 can be inserted. Round opening section 2b is formed on bottom section 2a of holder 2. Bottom section 2a is integrally formed with side section 2c (a side wall) of holder 2. Bottom section 2a protrudes inward from side section 2c, to support combination lens 6.

Cover 4 is installed on top of holder 2, to cover opening section 2h of holder 2. Cover 4 is formed of resin, and more preferably, is structured of a material which is durable for the reflow soldering process.

Round opening section 4b is formed on top plate section 4a of cover 4. Top plate section 4a is integrally formed with side section 4c (a side wall) of cover 4. Top plate section 4a covers combination lens 6 at a region which is other than opening section 4b.

Combination lens 6 is an example of an optical lens, which is structured of meniscus lens 8, being convex toward the object side, and meniscus lens 10, being convex toward the image side.

Meniscus lens 8 is arranged on the object side, and meniscus lens 10 is arranged on the image side.

Meniscus lenses 8 and 10 are formed of glass or resin, and more preferably formed of a material which is durable for the reflow soldering process.

Meniscus lens 8 is structured of lens 8a and non-lens section 8b (which is a flange). Lens section 8a includes a part of an area which is beyond the effective optical diameter. Non-lens section 8b is provided on the outside of lens section 8a.

Convex lens section 8c and concave lens section 8d are formed on lens section 8a. Convex lens section 8c is formed on the object side of lens section 8a, so that convex lens section 8c exposes through opening section 4b of cover 4. Opening section 4b of cover 4 functions as diaphragm 4d. Concave lens section 8d is formed on the image side of lens section 8a. Each of convex lens section 8c and concave lens section 8d has an aspherical surface.

Meniscus lens 10 is structured of lens 10a and non-lens section 10b (which is a flange). The diameter of lens section 10 is greater than that of lens section 8a of meniscus lens 8. Lens section 10a includes a part of an area which is beyond the effective optical diameter. Non-lens section 10b is provided on the outside of lens section 10a.

Concave lens section 10c and convex lens section 10d are formed on lens section 10a. Concave lens section 10c is formed on the object side of lens section 10a, so that concave lens section 10c faces concave lens section 8d. Convex lens section 10d is formed on the image side of lens section 10a, and exposes through opening section 2b of holder 2. Opening section 2b of holder 2 functions as diaphragm 2d. Each of concave lens section 10c and convex lens section 10d has an aspherical surface.

However convex lens section 8c, concave lens section 8d, concave lens section 10c and convex lens section 10d are not always limited to be an aspherical surface. They can be a spherical surface, or they can be a spherical surface or an aspherical surface, each of which has minute concave-convex portions by which a phase difference is applied to an incident light.

Concerning combination lens 6, sloping section 8j is formed on the image side of meniscus lens 8, and sloping section 10j is formed on the object side of meniscus lens 10. Sloping sections 8j and 10j are adhered to each other to be combination lens 6.

Sloping section 8j of meniscus lens 8 is formed on the outside of lens section 8a, to exhibit a circularity centered on the optical axis. Sloping section 10j of meniscus lens 10 is formed on the outside of lens section 10a, to exhibit a circularity centered on the optical axis.

Further concerning combination lens 6, under the condition that meniscus lenses 8 and 10 are adhered to each other, convex lens section 8c and concave lens section 8d of meniscus lens 8, and concave lens section 10c and convex lens section 10d of meniscus lens 10 are aligned to have a common central axis, so that each lens section has a common optical axis.

On imaging lens unit 200 shown in FIG. 2, the outer diameter of combination lens 6 (being meniscus lens 8 and 10) is smaller than the inner diameter of side section 2c of holder 2, whereby clearance 60 (being an empty space) is formed between the periphery surface of combination lens 6 and the inner wall surface of holder 2.

On non-lens section 10b of meniscus lens 10, slanted stepping section 10e (being a sloping surface) and flat peripheral border section 10f are formed, whereby clearance 62 (being an empty space) is formed between non-lens section 10b of meniscus lens 10 and bottom section 2a of holder 2.

Opening section 2b (being diaphragm 2d) of holder 2 is structured to be a sloping section (being a sloping surface) whose opening section is reduced in size from the object side to the image side. Circular peripheral border section 2e is formed while centered on the optical axis on the sloping section of opening section 2b. Peripheral border section 2e is in contact with convex lens section 10d of meniscus lens 10. Peripheral border section 2e functions as a contacting section.

Convex lens section 10d is formed of effective diameter section 10h and non-effective diameter section 10i. Effective diameter section 10h is a region to structure an effective diameter area, among various sections of convex lens section 10d. Non-effective diameter section 10i is a region formed at the outside of effective diameter section 10h. Non-effective diameter section 10i is formed at the outside of an effective diameter area, protruding toward the image side from non-lens section 10b.

On imaging lens unit 200, peripheral border section 2e is in contact with non-effective diameter section 10i from the periphery, in the direction (being X and Y directions) perpendicular to the optical axis, and diaphragm 2d controls movement of combination lens 6 in the X and Y axes. Diaphragm 2d is a control section to control the movement of combination lens 6 in directions X and Y in the internal space formed by holder 2 and cover 4.

Protruding section 4e (protrusion) is formed downward on top plate section 4a of cover 4. Protruding section 4e is formed to be circular centered on the optical axis, and its lower surface exhibits a flat surface. Protruding section 4e is in contact (being a plane contact) with non-lens section 8b which is formed to be parallel in the direction perpendicular to the optical axis of meniscus lens 8, while both sections 4e and 8b use their flat surfaces to contact with each other. Protruding section 4e functions as a contacting section.

Protruding section 4e of cover 4 supports combination lens 6 within holder 2, so that combination lens 6 is controlled not to move in direction Z. Protruding section 4e functions as a controlling section which controls the movement of combination lens 6 in direction Z within the internal space formed by holder 2 and cover 4.

Circular peripheral border section 4f is formed while centering on the optical axis, on opening section 4b (which is diaphragm 4d) of cover 4. Said section 4f is in contact (line contact) with convex lens section 8c of meniscus lens 8. Circular peripheral border section 4f functions as a contacting section.

Convex lens section 8c is structured of effective diameter section 8h and non-effective diameter section 8i. Effective diameter section 8h is a region to structure an effective diameter area, among various sections of convex lens section 8c. Non-effective diameter section 8i is a region formed at the outside of effective diameter section 8k Non-effective diameter section 8i is formed at the outside of an effective diameter area, protruding toward the image side from non-lens section 8b.

On imaging lens unit 200, peripheral border section 4f is in contact with non-effective diameter section 8i, so that said section 4f controls the movement of combination lens 6 in directions X and Y. Diaphragm 4d is a control section to control the movement of combination lens 6 in directions X and Y in the internal space formed by holder 2 and cover 4.

Circular peripheral border section 4f is formed while centering on the optical axis, on opening section 4b (which is diaphragm 4d) of cover 4. To function as the diaphragm, it is desired that no clearance is formed between circular peripheral border section 4f and convex lens section 8c of meniscus lens 8. Further, since cover 4 is formed of resin, minor shape changes can be conducted. A condition exhibiting no clearance can be formed, when circular peripheral border section 4f is controlled to be in contact with convex lens section 8c of meniscus lens 8.

In the present Specification, as shown in FIG. 1, the right-left direction represents direction X, the forward-backward direction represents direction Y, and the upward-downward direction represents direction Z.

In this case, meniscus lenses 8 and 10 are illustrated by an example of the structure of combination lens 6, however, the present invention is not limited to this structure. That is, various lens structures, as well as lens structures other than a meniscus lens, can be included in an optical lens using combination lens 6, within the scope satisfying required optical characteristics.

Further, the optical lens can be structured of more than three lenses.

Still further, the optical lens can be structured of adhered lenses, each of which is formed individually. Still further, after plural lenses are simultaneously molded to be wafer shapes, each of which is formed to be a lens wafer, then, they are adhered to each other, and cut to be a single part, and which can become the optical lens as the present invention. Accordingly, the shape of the optical lens, viewed in the optical axial direction, is not only a circular shape, but also a rectangle shape or the like, having been formed to be a single part after cutting.

As shown in FIG. 1, fitting members 70 are provided on four portions on imaging lens unit 200, to which holder 2 and cover 4 are connected. Fitting member 70 is formed of resin, which is preferably the same resin as holder 2 and cover 4, and more preferably, fitting member 70 is formed of a material which is durable in the reflow soldering process.

As shown in FIG. 2, on one end of fitting member 70, fitting section 78 is formed to fit onto a portion of holder 2, while on the other end of fitting member 70, fitting section 80 is formed to fit onto a portion of cover 4. Each of fitting sections 78 and 80 is shaped to be a hook. Connecting section 72 (being a shaft section), located between fitting section 78 and fitting section 80, are shaped to be a line, whereby connecting section 72 is in contact with the sides of holder 2 and cover 4 from the outside. Connecting section 72 and fitting sections 78 and 80 are integrally molded.

On imaging lens unit 200, protruding section 2i is formed on side section 2c of holder 2, and protruding section 4i is formed on side section 4c of cover 4, that is, fitting section 78 of fitting member 70 is configured to fit onto protruding section 78, and fitting section 80 of fitting member 70 is configured to fit onto protruding section 4i.

Further, on imaging lens unit 200, fitting member 70 can be formed to be a tubular shape to encircle holder 2 and cover 4.

Next, a production method of imaging lens unit 200 is detailed.

Imaging lens unit 200 is produced in accordance with steps (a)-(f).

(a) Molding holder 2 and cover 4 (a primary molding step)
(b) Positioning holder 2 and cover 4 in the vertical direction
(c) Arranging combination lens 6 between holder 2 and cover 4
(d) Installing combination lens 6 on holder 2
(e) Molding fitting member 70 (a secondary molding step), and connecting holder 2 to cover 4
(f) Removing imaging lens unit 200 from a production device (a molding die device)

Figure 3:
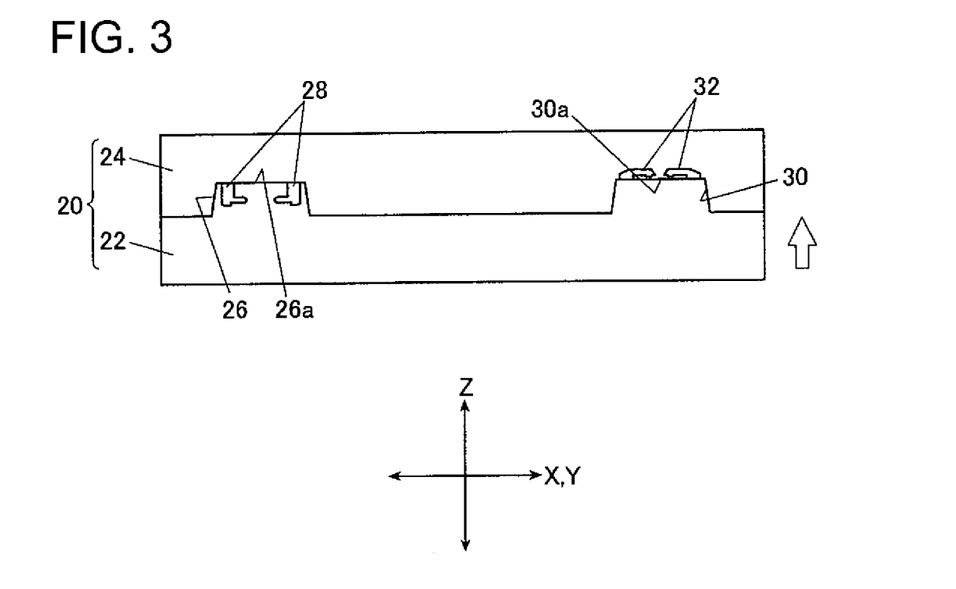
FIG. 3 is a figure to schematically show a molding die device and a production method of the imaging lens unit.

According to the present production method, steps (a)-(f) are conducted in a single molding die device (a pair of the molding dies), which is molding die device 20 shown in FIG. 3.

Molding die device 20 is basically formed of metal, but said device 20 can be formed of materials other than metal (such as glass or resin).

As shown in FIG. 3, molding die device 20 is structured of two molding dies, and in more detail, molding die device 20 is structured of movable die 22, which can move in the opening-closing direction (which is direction Z), and stationary die 24, which cannot move in the die opening-closing direction.

Movable die 22 can move vertically, and stationary die 24 is fixed at a predetermined height position. In this case, one is movable die 22 and the other is stationary die 24, that is, one molding die is configured to move relatively against the other die in direction Z. Both dies can be configured to move in direction Z.

Movable die 22 and stationary die 24 can move in the directions (directions X, Y) perpendicular to the die opening-closing direction. Further, either movable die 22 or stationary die 24 can be configured to move.

More than two convex sections 26 are formed on movable molding die 22. Each convex section 26 is tapered to become narrower, from its base to its top. Each convex section 26 is a parting surface to make top surface 26*a* to cramp stationary die 24. Holder molding section 28 is formed on top surface 26*a* (top section) of one of convex sections 26, to form holder 2 between stationary molding die 24 and movable molding die 22. Holder molding section 28 is a hollow section (cavity) to match the shape of holder 2.

More than two concave sections 30 are formed on stationary molding die 24. Each concave section 30 exhibits a shape which can conduct a concave-convex fit onto a side surface (shape) of convex section 26 of movable molding die 22. Each concave section 30 is tapered to become wider from its bottom surface to its opening, which is opposite against convex section 26. Each concave section 30 is a parting surface to make bottom surface 30*a* to cramp movable molding die 22. Cover molding section 32 is formed on bottom surface 30*a* (bottom section) of concave section 30, to form cover 4 between movable molding die 22 and stationary molding die 24. Cover molding section 32 is a hollow section (cavity) to match the shape of cover 4.

As reverse ways, convex section 26 can be formed on stationary molding die 24, and concave section 30 can be formed on movable molding die 22, and holder molding section 28 can be formed on concave section 30, and cover molding section 32 can be formed on convex section 26.

On step (a), as shown in FIG. 3, movable molding die 22 and stationary molding die 24 are cramped to each other, whereby a molding empty space, to form holder 2 and cover 4, is formed.

Subsequently, resin is injected into each molding empty space (holder molding section 28 and cover molding section 32), so that holder 2 and cover 4 are simultaneously molded. An injection means (which is not illustrated) to inject melted resin is provided on molding die device 20. In step (2), the melted resin is injected into each molding empty space from said injection means.

Holder 2 and cover 4 can be formed of the same resin (the same type of resin), or formed of different resins (different type of resins). More preferably, the same resin is injected into holder molding section 28 and cover molding section 32, and holder 2 and cover 4 are formed of the same material. Pigment is included in the resin for forming holder 2 and cover 4 (the resin is colored black), so that holder 2 and cover 4 can be formed to be light-blocking.

Figure 4:
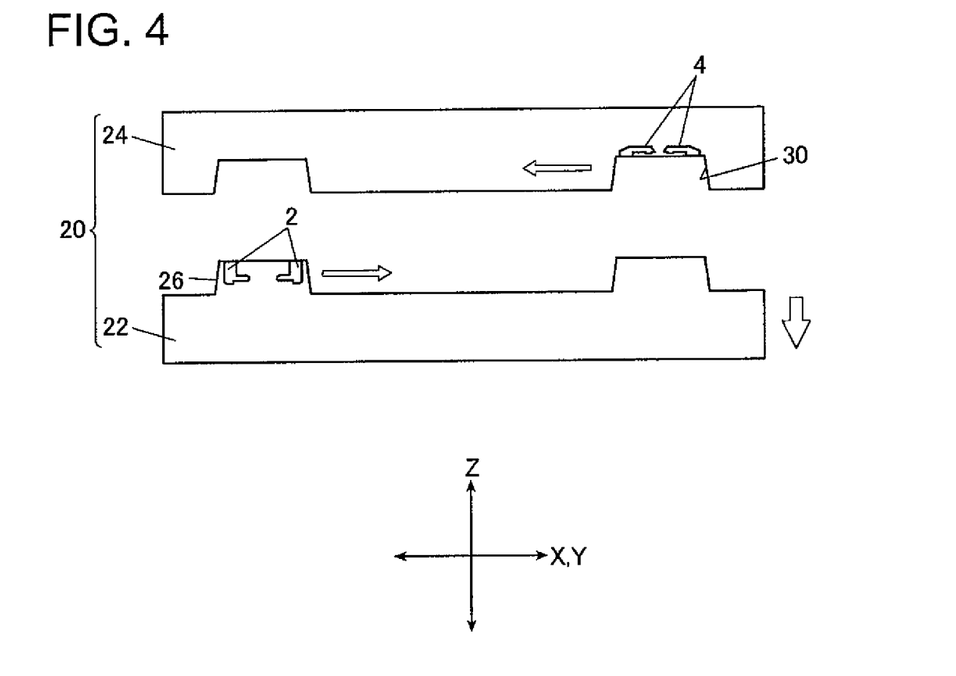
FIG. 4 is a figure to schematically show a production method of the imaging lens unit.

In step (b), as shown in FIG. 4, while holder 2 is supported by movable molding die 22, and cover 4 is supported by stationary molding die, movable molding die 22 is lowered to open the die.

Subsequently, while the die is open, movable molding die 22 and stationary molding die 24 are moved in axial directions X and Y, so that holder 2 and cover 4 are moved to a joining position. That is, convex section 26 and concave section 30 are arranged to vertically face each other (creating a positional alignment).

Since convex section 26 of movable molding die 22 and concave section 30 of stationary molding die 24 are shaped for the concave-convex fit, the shapes of convex section 26 and concave section 30 function to make movable molding die 22 and stationary molding die 24 to be positioned at high accuracy.

Figure 5:
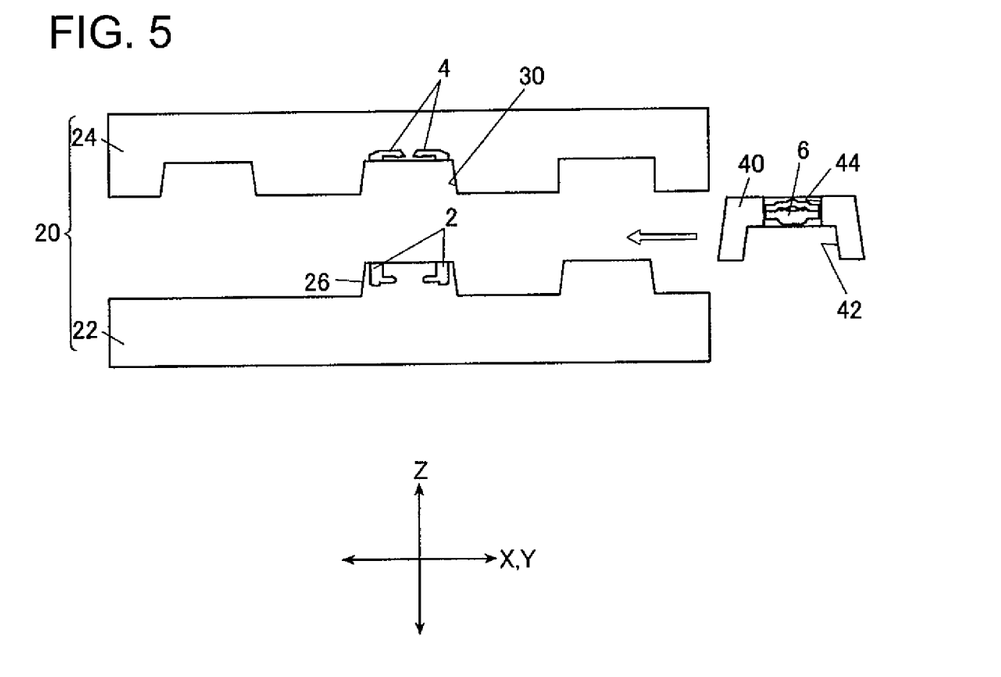
FIG. 5 is a figure to schematically show a production method of the imaging lens unit.

In step (c), as shown in FIG. 5, jig 40 is arranged between convex section 26 and concave section 30.

Concave section 42 is formed on the bottom of jig 40. Concave section 42 is shaped to match the side surface (shape) of convex section 26. Storage section 44 (empty space section) to store combination lens 6 is formed on the top of concave section 42. A locking mechanism (which is not illustrated) to lock combination lens 6 is provided on storage section 44. In storage section 44, combination lens 6 is accommodated, while being locked.

Wall surfaces of storage section 44 and concave section 42 are manufactured not to be in axial misalignment. Accordingly, in the condition that combination lens 6 has been locked, concave section 42 and combination lens 6 are positioned, while their axes coincide. When concave section 42 and convex section 26 are fitted together and their locked condition is released, combination lens 6 can be positioned on holder 2 with high accuracy to be inserted.

Figure 6:
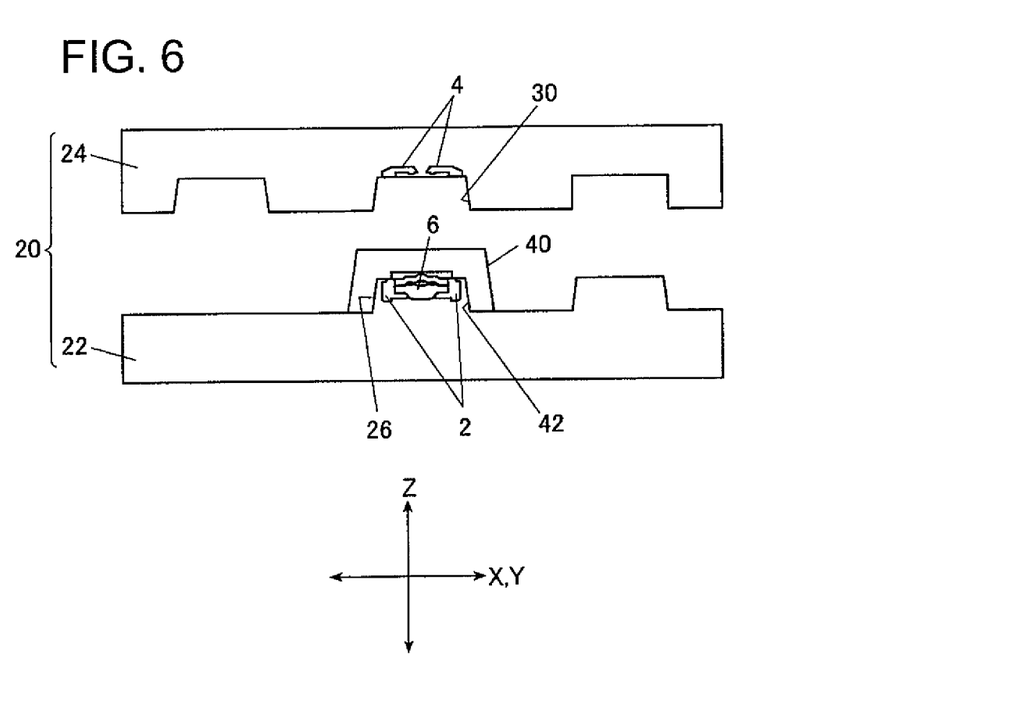
FIG. 6 is a figure to schematically show a production method of the imaging lens unit.

In step (d), as shown in FIG. 6, concave section 42 of jig 40 is fitted onto convex section 26.

When convex section 26 and concave section 42 are fitted to each other, holder 2 and combination lens 6 are positioned in the vertical direction. Under this condition, jig 40 is unlocked, and combination lens 6 is inserted into holder 2 through opening section 2*h*, to install (insert) combination lens 6 in holder 2.

In this case, convex lens section 10*d* of combination lens 6 is made to come into contact with the peripheral border section of opening section 2*b* of holder 2, to position the optical axis of combination lens 6 in the predetermined direction.

In the above explanation, combination lens 6 was inserted into holder 2 via jig 40 mounted on movable molding die 22, however, the present invention is not limited to this method. That is, combination lens 6 can be inserted into holder 2 manually, or by other devices, while jig 40 is not used.

However, since combination lens 6 is inserted by jig. 40, no foreign particle can adhere onto combination lens 6, though the foreign particles could adversely adhere in the case of manual insertion. Further, since jig 40 is used to conduct the concave-convex fitting onto movable molding die 22 as shown in the present invention, combination lens 6 can be basically inserted, under the condition that combination lens 6 and holder 2 are securely positioned, whereby incorrect insertion cannot occur.

Further, in the above explanation, movable molding die 22 and stationary molding die 24 are positioned, while the sections for forming the molding empty spaces are formed of convex section 26 and concave section 30, whereby holder 2 and cover 4 are precisely positioned by a taper fitting, and jig 40 to insert combination lens 6 is fitted onto said convex section 26. Accordingly, the sections to form the products are configured to have fitting shapes, so that the positioning work for each molding empty space is most preferable with respect to accuracy, however, the present invention is not limited to this method.

Figure 9:
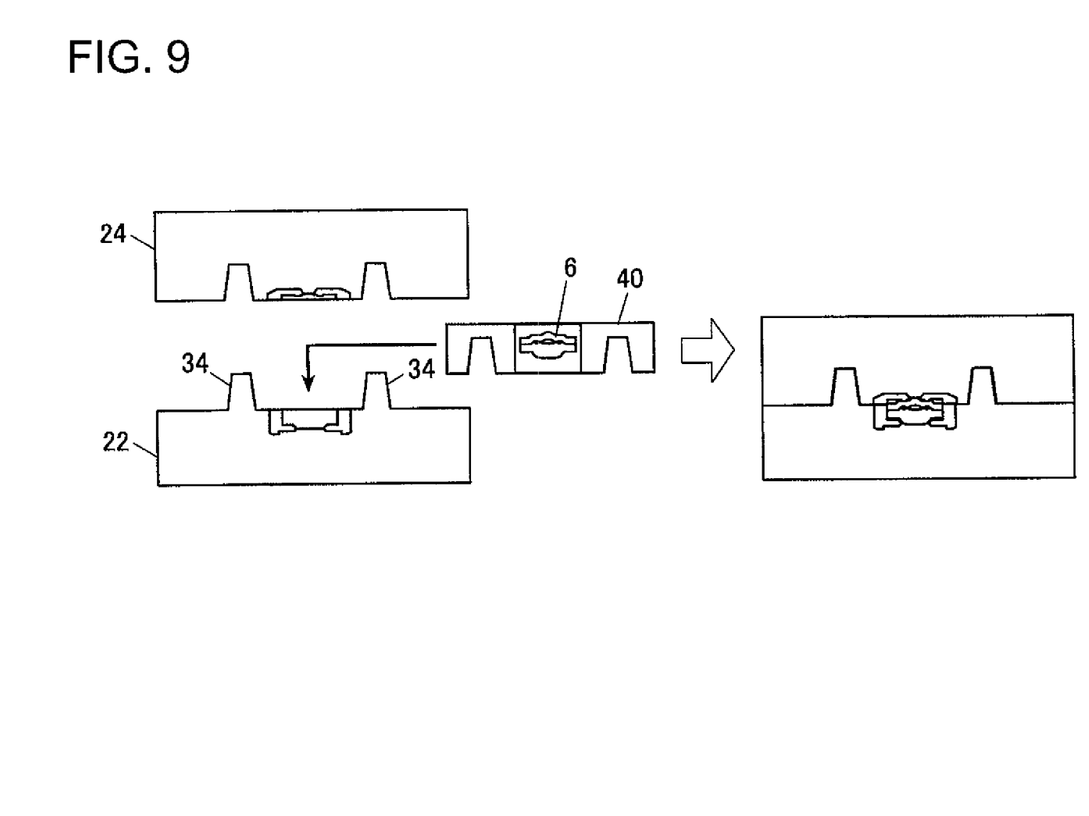
FIG. 9 is a figure to schematically show a variation of the molding die device.
Figure 10:
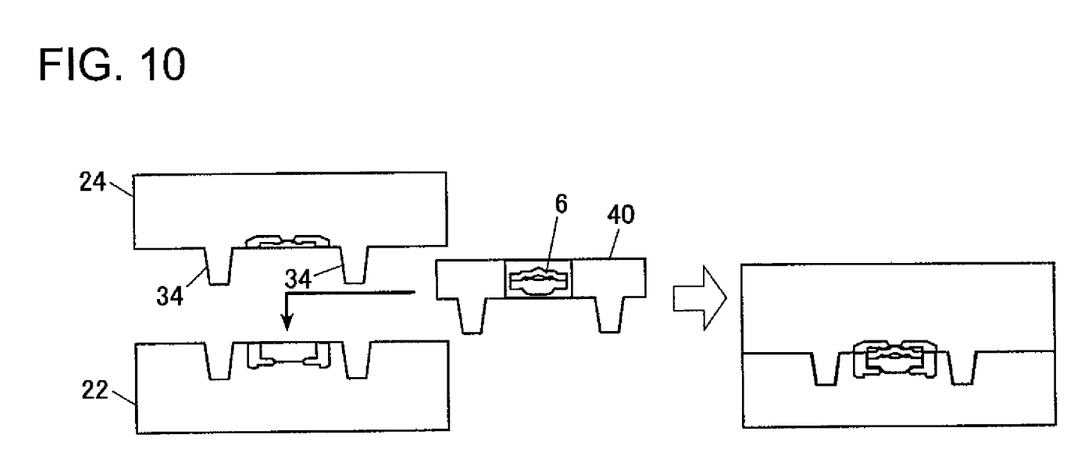
FIG. 10 is a figure to schematically show a variation of the molding die device.

As shown in FIGS. 9 and 10, taper pins 34 are provided on portions other than the molding empty spaces of both movable molding die 22 and stationary molding die 24, so that movable molding die 22 and stationary molding die 24 can be accurately positioned due to fitting of taper pins 34. The convex-concave fitting of the present invention includes said fitting structure.

Jig 40 can be changed based on said structure, as shown in FIGS. 9 and 10.

In the jig structures as detailed above, the convex-concave sections of molding die device 20 is used for positioning jig 40, whereby combination lens 6 can be precisely inserted into holder 2 to be molded.

Still further, after the insertion and positioning of combination lens 6, jig 40 is released from the molding die.

Figure 7:
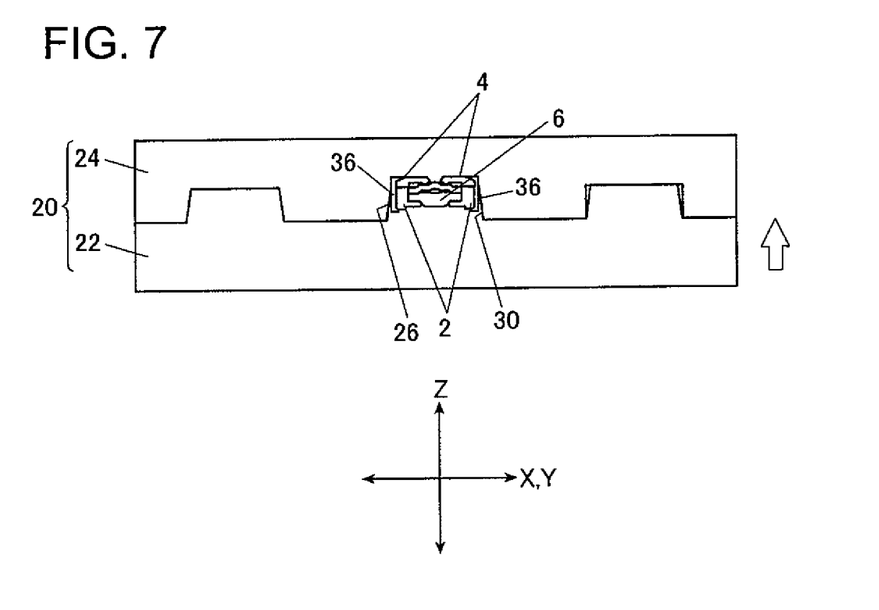
FIG. 7 is a figure to schematically show a production method of the imaging lens unit.

In step (e), as shown in FIG. 7, movable molding die 22 is driven upward to cramp, so that holder 2, in which combination lens 6 has been installed, and cover 4 is aligned.

In this case, convex section 26 of movable molding die 22 is fitted into concave section 30 of stationary molding die 24.

When concave section 30 and convex section 26 have been fitted into each other, movable molding die 22 is aligned with stationary molding die 24, and arrangement of holder 2 and cover 4 is positioned, under which condition, holder 2 and cover 4 are in contact with each other.

Further, movable molding die 22 and stationary molding die 24 are cramped to each other. Between holder 2 and cover 4, and movable molding die 22 and stationary molding die 24, fitting member molding section 36 to form fitting member 70 is formed. That is, in step (e), movable molding die 22 and stationary molding die 24 are cramped together, and fitting member molding section 36 is formed Fitting member molding section 36 is a molding empty space (hollow section), which matches the shape of fitting member 70.

Under this condition, melted resin is injected from the injecting device into fitting member molding section 36, so that fitting member 70 is molded, and holder 2 and cover 4 are joined to each other.

Figure 8:
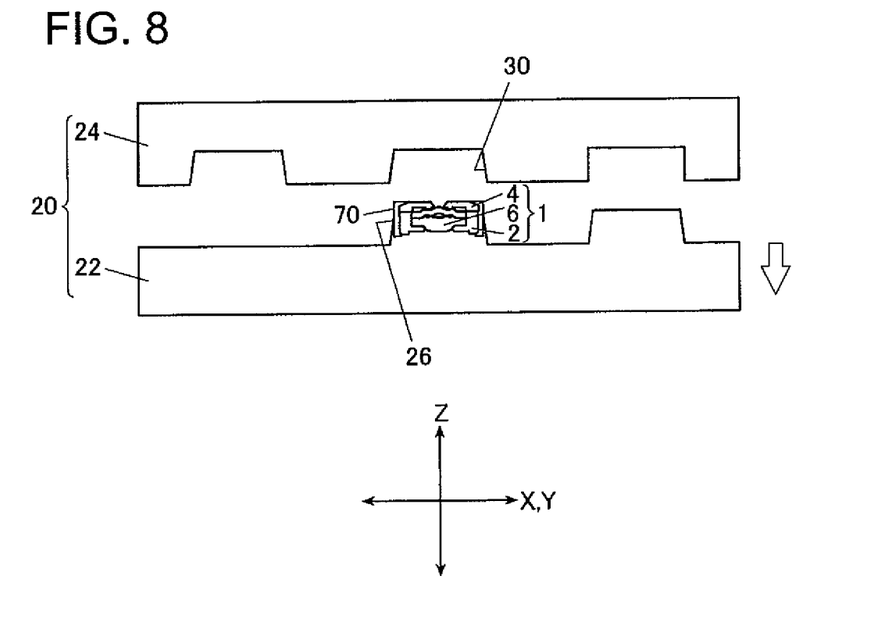
FIG. 8 is a figure to schematically show a production method of the imaging lens unit.

In step a), as shown in FIG. 8, movable molding die 22 is driven downward so that movable molding die 22 separates from stationary molding die 24.

In this operation, it is preferable that holder 2 and fitting member 70, molded by movable molding die 22, and cover 4 and fitting member 70, molded by stationary molding die 24, remain on movable molding die 22, to be separating shapes. However, if a member remains in stationary molding die 24, a mechanism to push said member from stationary molding die 24 should be provided so that said member can be separated from the die.

After that, a compound member (imaging lens unit 200), which is formed of holder 2, cover 4, combination lens 6 and fitting member 70, and remains in movable molding die 22, is released from convex section 26.

Accordingly, imaging lens unit 200 can be produced in a single set of molding die device 20.

To produce an electronic device including imaging lens unit 200, the reflow soldering process is conducted, and imaging lens unit 200 and other electronic parts are simultaneously mounted on a printed circuit board, which is an example.

For example, solder is arranged on the printed circuit board in advance, imaging lens unit 200 and the electronic parts are arranged on the printed circuit board. Subsequently, the printed circuit board is placed in a reflow furnace and heated so that the placed solder is melted. After the printed circuit board has cooled, imaging lens unit 200 and the electronic parts can be simultaneously mounted on the printed circuit board.

If holder 2, cover 4, combination lens 6, and fitting member 70 are formed of materials which are durable during the reflow soldering process, imaging lens unit 200 is not deformed, and its optical characteristics are prevented from being destroyed.

According to the embodiments detailed above, after fitting member 70 is fitted onto holder 2 and cover 4, holder 2 and cover 4 are joined to each other. Regardless of the adhering area, holder 2 and cover 4 can be joined timely, so that cover 4 is prevented from separating from holder 2.

[Variation 1]

Variation 1 differs from the above embodiments (imaging lens unit 200 and its producing method) with respect to the following matters.

Figure 11:
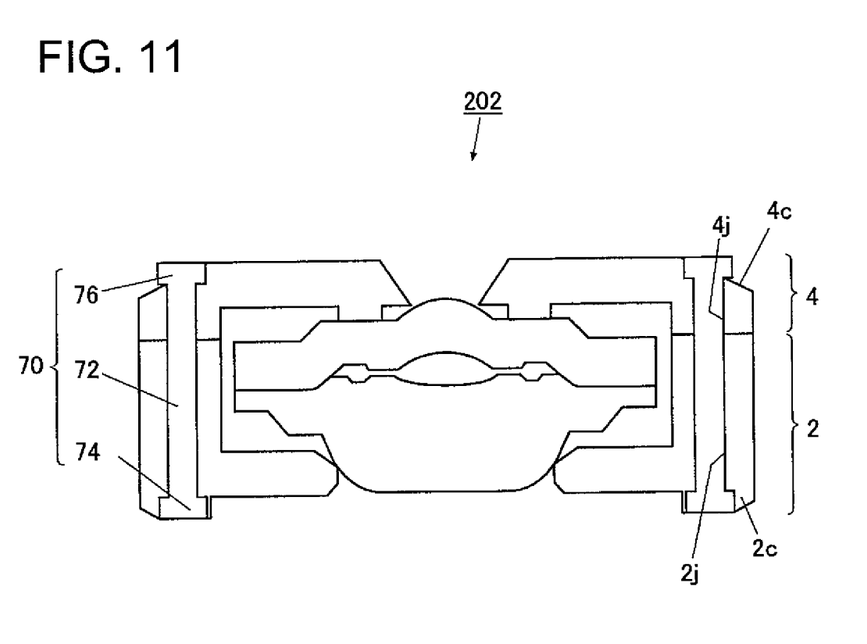
FIG. 11 is a figure to show variation (1) of the imaging lens unit of FIG. 2.

Concerning imaging lens unit 202 of variation 1, as shown in FIG. 11, through-hole 2j, penetrating vertically, is formed on side section 2c of holder 2. Through-hole 4j, penetrating vertically, is formed on side section 4c of cover 4. When cover 4 is placed on holder 2, through-holes 2j and 4j penetrate vertically.

Fitting member 70 is provided in a condition that through-hole 2j of holder 2 and through-hole 4j of cover 4 are straightly penetrating, so that fitting member 70 communicates to the inside of holder 2 and the inside of cover 4.

Fitting member 70 includes joined section 72 and fitting sections 74 and 76. The diameters of fitting members 74 and 76 are greater than the diameter of joined section 72. Joined section 72 and fitting members 74 and 76 are molded integrally.

In variation 1, joined section 72 penetrates through-holes 2j and 4j of holder 2 and cover 4, while fitting sections 74 and 76 fit holder 2 and cover 4, so that holder 2 and cover 4 are joined to each other.

[Variation 2]

Variation 2 differs from the above embodiments (imaging lens unit 200 and its producing method) with respect to the following matters.

Figure 12:
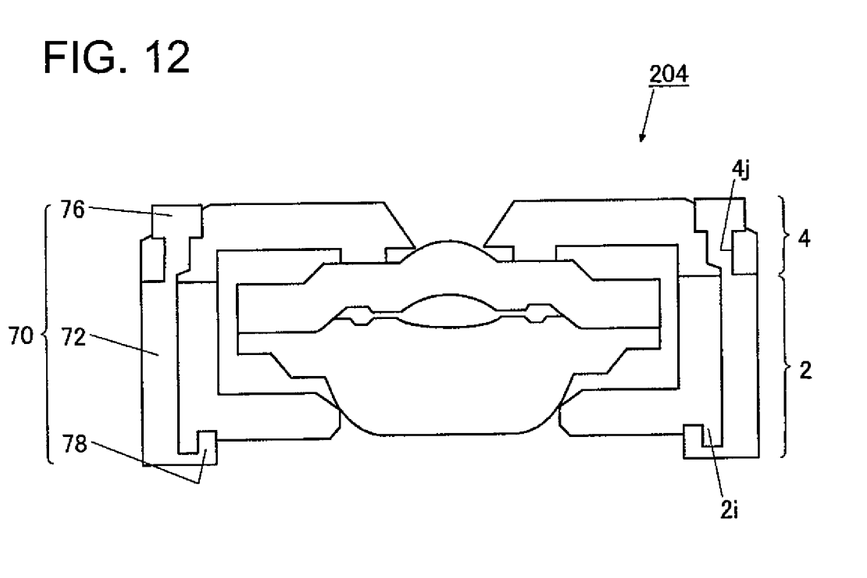
FIG. 12 is a figure to show variation (2) of the imaging lens unit of FIG. 2.

Concerning imaging lens unit 204 of variation 2, as shown in FIG. 12, through-hole 4j, penetrating vertically, is formed on side section 4c of cover 4.

Fitting member 76 is formed on fitting member 70 (the top section of joined section 72). The diameter of fitting member 76 is greater than the diameter of joined section 72. Joined section 72 and fitting sections 76 and 78 are integrally molded.

In variation 2, fitting member 70 leads to the inside of cover 4 from the periphery of holder 2. That is, joined section 72 of fitting member 70 elbows from the outer wall of side section 2c of holder 2 to through-hole 4g of cover 4, so that fitting member 78 fits onto protruding section 2i of holder 2, and fitting member 76 fits onto cover 4.

[Variation 3]

Variation 3 differs from the above embodiments (imaging lens unit 200 and its producing method) with respect to the following matters.

Figure 13:
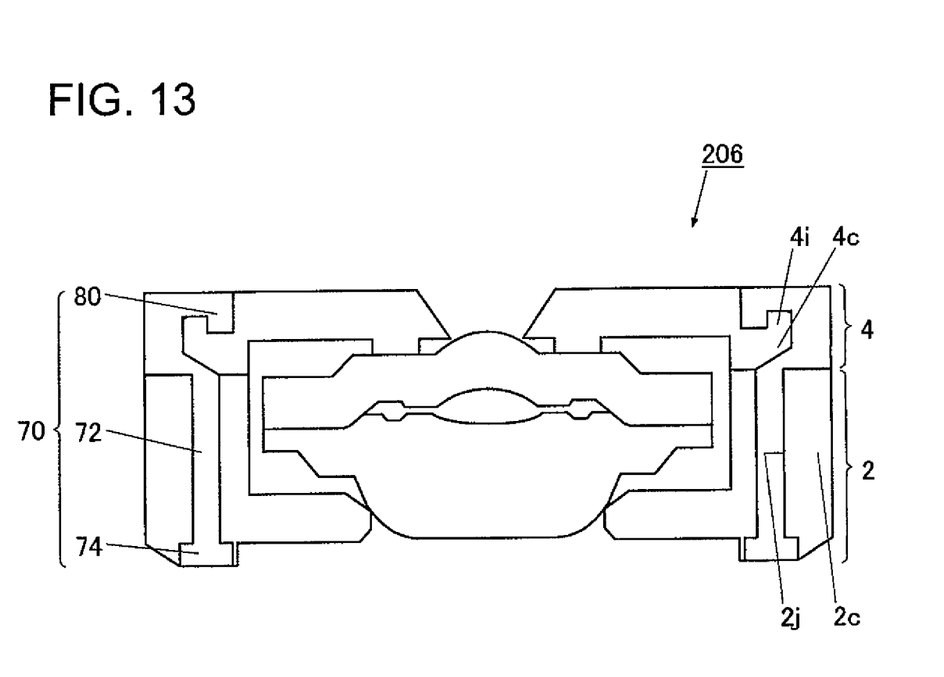
FIG. 13 is a figure to show variation (3) of the imaging lens unit of FIG. 2.

Concerning imaging lens unit 206 of variation 3, as shown in FIG. 13, through-hole 2j, penetrating vertically, is formed on side section 2c of holder 2.

Fitting member 74 is formed on fitting member 70 (the lower section of joined section 72). The diameter of fitting member 74 is greater than the diameter of joined section 72. Joined section 72 and fitting sections 74 and 80 are integrally molded.

In variation 3, fitting member 70 leads to the periphery of cover 4 from the inside of holder 2. That is, joined section 72 of fitting member 70 elbows from through-hole 2j of side section 2c of holder 2 to the outer wall of cover 4, so that fitting member 74 fits to holder 2, and fitting section 80 fits onto protruding section 4i of cover 4.

EXPLANATION OF ALPHA-NUMERICAL SYMBOLS 2 holder
2a bottom section
2b opening section
2c side section (side wall)
2d diaphragm
2e peripheral border section
2f protruding section 2g protruding section
2h opening section
2i protruding section
2j through-hole
4 cover
4a top plate section
4b opening section
4c side section (side wall)
4d diaphragm
4e protruding section
4f peripheral border section
4g protruding section
4i protruding section
4j through-hole
6 combination lens
8 meniscus lens
8a lens section
8b non-lens section (flange)
8c convex lens section
8d concave lens section
8e slope section
8h effective diameter section
8i non-effective diameter section
8j slope face section
10 meniscus lens
10a lens section
10b non-lens section (flange)
10c concave lens section
10d convex lens section
10e stepping section
10f peripheral border section
10g slope section
10h effective diameter section
10i non-effective diameter section
10j slope face section
20 molding die
22 movable molding die
24 stationary molding die
26 convex section
28 holder molding section
30 concave section
32 cover molding section
34 taper pin
36 fitting member molding section
40 jig
42 concave section
44 storage section
60 and 62 clearance
70 fitting member
72 joined section
74, 76, 78 and 80 fitting section
200, 202, 204 and 206 imaging lens unit

What is claimed is:

1. An imaging lens unit comprising:
    an optical lens; and
    an external covering comprising at least a holder and a cover for covering the optical lens from a surrounding environment,
    wherein:
    (a) the cover is positioned nearer an object side of the lens than the holder is,
    (b) the holder and the cover are fitted via a fitting member integrally molded by a resin material, the fitting member having, at respective ends of the fitting member:
        (i) a first fitting section configured to fit onto a part of the holder; and
        (ii) a second fitting section configured to fit onto a part of the cover,
    (c) the resin material has a joined section between the first and second fitting sections, and
    (d) the first fitting section includes a first bent section configured to prevent the holder from releasing toward an image side of the lens and in a lateral direction, and the second fitting section includes a second bent section configured to prevent the cover from releasing toward the object side of the lens and in the lateral direction.

2. The imaging lens unit of claim 1, wherein the first fitting section includes a hook shape configured to fit onto a protrusion provided on the holder, and/or the second fitting section includes a hook shape configured to fit onto a protrusion provided on the cover.

3. The imaging lens unit of claim 1,
    wherein the first fitting section exhibits a diameter which is greater than the joined section to be inserted into a first through-hole which is provided on the holder to penetrate in an optical axial direction, and/or the second fitting section exhibits a diameter which is greater than the joined section to be inserted into a second through-hole which is provided on the cover to penetrate in the optical axial direction.

4. The imaging lens unit of claim 1,
    wherein the joined section between the first fitting section and the second fitting section of the fitting member is in contact with a side surface of the external covering from the outside.

5. The imaging lens unit of claim 1,
    wherein the optical lens, the holder, the cover and the fitting member are formed of materials which are durable in a reflow soldering process for mounting electronic parts on a printed circuit board.

6. The imaging lens unit of claim 1,
    wherein the imaging lens unit includes plural fitting members, each of which includes the first fitting section, the second fitting section, and the joined section, to fit onto the cover and the holder respectively at plural positions.

7. The imaging lens unit of claim 1,
    wherein an external surface of the cover comprises plural concave sections, and wherein the imaging lens unit comprises plural fitting members fitted onto the plural concave sections.

8. The imaging lens unit of claim 1, wherein the fitting member is configured to have a tubular shape to encircle the holder and the cover.

9. The imaging lens unit of claim 1,
    wherein:
    an outer diameter of the optical lens is smaller than an inner diameter of the holder, and
    a clearance is formed between a periphery surface of the optical lens and an inner wall surface of the holder.

10. The imaging lens unit of claim 1,
    wherein:
    an opening section of the holder forms a tapered section whose inner diameter of an opening is reduced from the object side toward the image side,
    a circular peripheral border section having a center on the optical axis is formed on the sloping section of the opening section, and
    the peripheral border section is in contact with the optical lens.

11. The imaging lens unit of claim 10,
    wherein:
    the optical lens includes a lens section and a non-lens section which exists around the lens section, and a clearance is formed between the non-lens section of the optical lens and a bottom section of the holder.

12. The imaging lens unit of claim 1,
wherein:
the optical lens includes a lens section and a flat non-lens section which is arranged around the lens section and is parallel in a direction perpendicular to the optical axis of the optical lens,
a protruding section is formed on a top plate section of the cover, wherein the protruding section is configured to be circular and centered on the optical axis, such that a lower surface of the protruding section is a flat surface, and
the flat surface of the protruding section and the flat non-lens section are in contact with each other as a plane contact.

13. The imaging lens unit of claim 1,
wherein:
a circular peripheral border section centering on the optical axis is formed on an opening section of the cover, and
the circular peripheral border section is in contact with the lens section of the optical lens.

14. The imaging lens unit of claim 13,
wherein the circular peripheral border section formed on the opening section of the cover functions as a diaphragm.

15. The imaging lens unit of claim 1,
wherein:
the optical lens includes a lens section and a flat non-lens section which is arranged around the lens section and is parallel in a direction perpendicular to the optical axis of the optical lens,
a protruding section is configured to protrude downward on a top plate section of the cover, and the protruding section is configured to be circular and centered on the optical axis, wherein a lower surface of the protruding section is a flat surface,
the flat surface of the protruding section and the flat non-lens section are in contact with each other as a plane contact,
a circular peripheral border section centering on the optical axis is formed on the opening section of the cover, and is in contact with the lens section of the optical lens, and
a circular peripheral border section centered on the optical axis is formed on the opening section of the holder, and the peripheral border section is in contact with the optical lens.

16. The imaging lens unit of claim 1,
wherein the optical lens is formed in such a way that after plural lenses are simultaneously molded to be a wafer shape, each of which is cut to be a lens as a single part.

17. The imaging lens unit of claim 1,
wherein the optical lens comprises more than three lenses.

18. A method of producing an imaging lens unit, comprising steps of:
cramping a first molding die with a second molding die for forming a first molding empty space for molding a holder between the first molding die and the second molding die;
cramping a third molding die with a fourth molding die for forming a second molding empty space for molding a cover between the third molding die and the fourth molding die;
filling a melted resin into the first molding empty space for molding the holder;
filling a melted resin into the second molding empty space for molding the cover;
opening the first molding die and the second molding die while the first molding die supports the holder, and opening the third molding die and the fourth molding die while the third molding die supports the cover;
shifting at least one of the molding dies in a direction perpendicular to a die opening-cramping direction against the other molding die, and shifting the holder and the cover to a position where the holder and the cover are joinable, after the first molding die and second molding die have been opened, and after the third molding die and the fourth molding die have been opened;
inserting an optical lens into the holder through an opening, after the first molding die and the second molding die have been opened, and after the third molding die and the fourth molding die have been opened;
cramping the first molding die with the second molding die, and cramping the third molding die with the fourth molding die, wherein each die exists at the joinable position, and determining a position of the holder carrying the lens and a position of the cover;
forming a third molding empty space for a second molding operation, between the holder and the cover, both of whose positions have been determined, and the first molding die and the third molding die; and
filling the melted resin into the third molding empty space, to integrally mold a fitting member having, at respective ends of the fitting member: a first fitting section configured to fit onto a part of the holder and a second fitting member configured to fit onto a part of the cover, and joining the holder and the cover by using the fitting member,
wherein the first fitting section includes a first bent section configured to prevent the holder from releasing toward an image side of the lens and in a lateral direction, and the second fitting section includes a second bent section configured to prevent the cover from releasing toward an object side of the lens and in the lateral direction.

19. The method of producing the imaging lens unit of claim 18, wherein
the first molding die and the fourth molding die represent a first molding die unit, and
the second molding die and the third molding die represent a second molding die unit,
whereby the first molding die unit and the second molding die unit are paired, to simultaneously mold the holder and the cover.

20. The method of producing the imaging lens unit of claim 18, wherein
a first convex section and a second convex section are provided on the first molding die,
a first concave section and a second concave section are provided on the third molding die,
wherein the method comprises steps of
forming one of the first and second molding empty spaces, by the first convex section and the first concave section;
forming another one of the first and second molding empty spaces, by the second convex section and the second concave section; and
forming the third molding empty space, by the first convex section and the first concave section, or by the second convex section and the second concave section.

* * * * *